United States Patent
Sukhija (10) Patent No.: US 12,236,413 B2
(45) Date of Patent: Feb. 25, 2025

(54) METHOD AND SYSTEM FOR RECONFIGURING A TRANSACTION DURING NETWORK PROCESSING

(71) Applicant: Visa International Service Association, San Francisco, CA (US)

(72) Inventor: Rohit Sukhija, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/104,520

(22) Filed: Feb. 1, 2023

(65) Prior Publication Data

US 2023/0177483 A1 Jun. 8, 2023

Related U.S. Application Data

(63) Continuation of application No. 16/825,378, filed on Mar. 20, 2020, now Pat. No. 11,593,781.

(51) Int. Cl.
*G06Q 20/00* (2012.01)
*G06Q 20/02* (2012.01)
*G06Q 20/20* (2012.01)
*G06Q 20/40* (2012.01)

(52) U.S. Cl.
CPC ........ *G06Q 20/202* (2013.01); *G06Q 20/027* (2013.01); *G06Q 20/40* (2013.01)

(58) Field of Classification Search
CPC ..... G06Q 20/202; G06Q 20/027; G06Q 20/40
See application file for complete search history.

(56) References Cited

U.S. PATENT DOCUMENTS

| | | | |
|---|---|---|---|
| 2007/0205270 A1* | 9/2007 | Kemper | G06Q 30/0601 235/380 |
| 2019/0005582 A1* | 1/2019 | Kapur | G06Q 40/06 |
| 2020/0380490 A1* | 12/2020 | Jayachandran | G06Q 20/22 |

* cited by examiner

*Primary Examiner* — Rokib Masud
(74) *Attorney, Agent, or Firm* — The Webb Law Firm (57) ABSTRACT

Described are a system, method, and computer program product for reconfiguring a transaction during network processing. The method includes receiving, from a merchant system, a transaction request including transaction data and configured in an initial configuration associated with a single-message transaction or a dual-message transaction. The method includes determining, based at least partly on the transaction data and/or at least one parameter of a merchant profile associated with the merchant system, a recommended configuration associated with a single-message transaction or a dual-message transaction, the recommended configuration different from the initial configuration. The method includes reconfiguring the transaction request based on the recommended configuration. The method includes generating a communication to a transaction processing system configured to cause the transaction processing system to process the transaction request as a single-message transaction or a dual-message transaction based on the recommended configuration.

17 Claims, 4 Drawing Sheets

METHOD AND SYSTEM FOR RECONFIGURING A TRANSACTION DURING NETWORK PROCESSING

CROSS REFERENCE TO RELATED APPLICATION

This application is a continuation of U.S. patent application Ser. No. 16/825,378, filed Mar. 20, 2020, the disclosure of which is hereby incorporated by reference in its entirety.

BACKGROUND

1. Technical Field

Disclosed embodiments or aspects relate generally to electronic transaction processing networks and, in one particular embodiment or aspect, to a system, method, and computer program product for reconfiguring a transaction during network processing.

2. Technical Considerations

Electronic transaction processing networks may offer both single-message processing and dual-message processing capabilities. A transaction request originating at a point-of-sale (POS) device of a merchant that is communicated to a transaction service provider for processing may be processed in a single-message configuration or a dual-message configuration. Single-message processing requires fewer network messages and combines fund authorization and capture data into a single message. However, single-message processing may not be appropriate for certain transactions where fund authorization and capture are not contemporaneous. Dual-message processing includes separate network messages for authorization and capture, and is further configured to provide features related to partial funds capture, transaction reversing, refreshing authorization, authorization of an unknown amount, and/or the like. Incorrectly configured transactions may increase network costs (including processing fees and computer resource requirements).

Therefore, there is a need in the art for an improved system and method of dynamically processing transactions in an electronic transaction processing network according to detected recommended configurations and reconfiguring transactions during the network process flow.

SUMMARY

Accordingly, and generally, provided is an improved system, method, and computer program product for reconfiguring a transaction during network processing. Preferably, the method includes receiving, from a merchant system, a transaction request including transaction data and configured in an initial configuration associated with a single-message transaction or a dual-message transaction. Preferably, the method includes determining, based at least partly on the transaction data and/or at least one parameter of a merchant profile associated with the merchant system, a recommended configuration associated with a single-message transaction or a dual-message transaction, the recommended configuration different from the initial configuration. Preferably, the method includes reconfiguring the transaction request based on the recommended configuration. Preferably, the method includes generating a communication to a transaction processing system configured to cause the transaction processing system to process the transaction request as a single-message transaction or a dual-message transaction based on the recommended configuration.

According to non-limiting embodiments or aspects, provided is a computer-implemented method for reconfiguring a transaction during network processing. The method includes receiving, with at least one processor of a payment gateway and from a merchant system, at least one transaction request including transaction data, the at least one transaction request configured in an initial configuration associated with a single-message transaction or a dual-message transaction. The method includes determining, with at least one processor of a payment gateway, based at least partly on the transaction data and/or at least one parameter of a merchant profile associated with the merchant system, a recommended configuration associated with a single-message transaction or a dual-message transaction, the recommended configuration different from the initial configuration. The method includes reconfiguring, with at least one processor of a payment gateway, the at least one transaction request based on the recommended configuration. The method includes generating, with at least one processor of a payment gateway, a communication to a transaction processing system configured to cause the transaction processing system to process the at least one transaction request as a single-message transaction or a dual-message transaction based on the recommended configuration.

In some non-limiting embodiments or aspects, determining the recommended configuration may be based at least partly on the transaction data and the at least one parameter of the merchant profile. Determining the recommended configuration may be based at least partly on the transaction data including at least one of the following: payment device presence; goods or services description; transaction amount; transaction location; or any combination thereof. Determining the recommended configuration may be based at least partly on the at least one parameter of the merchant profile including at least one of the following: merchant category; transaction reversal history; transaction capture history; or any combination thereof.

In some non-limiting embodiments or aspects, the initial configuration may be associated with a dual-message transaction and the recommended configuration may be associated with a single-message transaction. Reconfiguring the at least one transaction request may include combining transaction authorization data and transaction capture data from the merchant system into a single communication to the transaction processing system.

In some non-limiting embodiments or aspects, the initial configuration may be associated with a single-message transaction and the recommended configuration may be associated with a dual-message transaction. Reconfiguring the at least one transaction request may include splitting a combined authorization and capture message into a transaction authorization message and a transaction capture message.

According to non-limiting embodiments or aspects, provided is a system for reconfiguring a transaction during network processing. The system includes a server of a payment gateway including at least one processor. The server is programmed and/or configured to receive, from a merchant system, at least one transaction request including transaction data, the at least one transaction request configured in an initial configuration associated with a single-message transaction or a dual-message transaction. The server is programmed and/or configured to determine, based at least partly on the transaction data and/or at least one parameter of a merchant profile associated with the merchant system, a recommended configuration associated with a single-message transaction or a dual-message transaction, the recommended configuration different from the initial configuration. The server is programmed and/or configured to reconfigure the at least one transaction request based on the recommended configuration. The server is programmed and/or configured to generate a communication to a transaction processing system configured to cause the transaction processing system to process the at least one transaction request as a single-message transaction or a dual-message transaction based on the recommended configuration.

In some non-limiting embodiments or aspects, determining the recommended configuration may be based at least partly on the transaction data and the at least one parameter of the merchant profile. Determining the recommended configuration may be based at least partly on the transaction data including at least one of the following: payment device presence; goods or services description; transaction amount; transaction location; or any combination thereof. Determining the recommended configuration may be based at least partly on the at least one parameter of the merchant profile including at least one of the following: merchant category; transaction reversal history; transaction capture history; or any combination thereof.

In some non-limiting embodiments or aspects, the initial configuration may be associated with a dual-message transaction, the recommended configuration may be associated with a single-message transaction, and reconfiguring the at least one transaction request may include combining transaction authorization data and transaction capture data from the merchant system into a single communication to the transaction processing system.

In some non-limiting embodiments or aspects, the initial configuration may be associated with a single-message transaction, the recommended configuration may be associated with a dual-message transaction, and reconfiguring the at least one transaction request may include splitting a combined authorization and capture message into a transaction authorization message and a transaction capture message.

According to non-limiting embodiments or aspects, provided is a computer program product for reconfiguring a transaction during network processing. The computer program product includes at least one non-transitory computer-readable medium including program instructions that, when executed by at least one processor, cause the at least one processor to receive, from a merchant system, at least one transaction request including transaction data, the at least one transaction request configured in an initial configuration associated with a single-message transaction or a dual-message transaction. The program instructions cause the at least one processor to determine, based at least partly on the transaction data and/or at least one parameter of a merchant profile associated with the merchant system, a recommended configuration associated with a single-message transaction or a dual-message transaction, the recommended configuration different from the initial configuration. The program instructions cause the at least one processor to reconfigure the at least one transaction request based on the recommended configuration. The program instructions cause the at least one processor to generate a communication to a transaction processing system configured to cause the transaction processing system to process the at least one transaction request as a single-message transaction or a dual-message transaction based on the recommended configuration.

In some non-limiting embodiments or aspects, determining the recommended configuration may be based at least partly on the transaction data and the at least one parameter of the merchant profile. Determining the recommended configuration may be based at least partly on the transaction data including at least one of the following: payment device presence; goods or services description; transaction amount; transaction location; or any combination thereof. Determining the recommended configuration may be based at least partly on the at least one parameter of the merchant profile including at least one of the following: merchant category; transaction reversal history; transaction capture history; or any combination thereof.

In some non-limiting embodiments or aspects, the initial configuration may be associated with a dual-message transaction, the recommended configuration may be associated with a single-message transaction, and reconfiguring the at least one transaction request may include combining transaction authorization data and transaction capture data from the merchant system into a single communication to the transaction processing system.

In some non-limiting embodiments or aspects, the initial configuration may be associated with a single-message transaction, the recommended configuration may be associated with a dual-message transaction, and reconfiguring the at least one transaction request may include splitting a combined authorization and capture message into a transaction authorization message and a transaction capture message.

Other non-limiting embodiments or aspects of the present disclosure will be set forth in the following numbered clauses:

Clause 1: A computer-implemented method for reconfiguring a transaction during network processing comprising: receiving, with at least one processor of a payment gateway and from a merchant system, at least one transaction request comprising transaction data, the at least one transaction request configured in an initial configuration associated with a single-message transaction or a dual-message transaction; determining, with at least one processor of a payment gateway, based at least partly on the transaction data and/or at least one parameter of a merchant profile associated with the merchant system, a recommended configuration associated with a single-message transaction or a dual-message transaction, the recommended configuration different from the initial configuration; reconfiguring, with at least one processor of a payment gateway, the at least one transaction request based on the recommended configuration; and generating, with at least one processor of a payment gateway, a communication to a transaction processing system configured to cause the transaction processing system to process the at least one transaction request as a single-message transaction or a dual-message transaction based on the recommended configuration.

Clause 2: The computer-implemented method of clause 1, wherein determining the recommended configuration is based at least partly on the transaction data and the at least one parameter of the merchant profile.

Clause 3: The computer-implemented method of clause 1 or clause 2, wherein determining the recommended configuration is based at least partly on the transaction data comprising at least one of the following: payment device presence; goods or services description; transaction amount; transaction location; or any combination thereof.

Clause 4: The computer-implemented method of any of clauses 1-3, wherein determining the recommended configuration is based at least partly on the at least one parameter of the merchant profile comprising at least one of the following: merchant category; transaction reversal history; transaction capture history; or any combination thereof.

Clause 5: The computer-implemented method of any of clauses 1-4, wherein the initial configuration is associated with a dual-message transaction and the recommended configuration is associated with a single-message transaction.

Clause 6: The computer-implemented method of any of clauses 1-5, wherein reconfiguring the at least one transaction request comprises combining transaction authorization data and transaction capture data from the merchant system into a single communication to the transaction processing system.

Clause 7: The computer-implemented method of any of clauses 1-6, wherein the initial configuration is associated with a single-message transaction and the recommended configuration is associated with a dual-message transaction.

Clause 8: The computer-implemented method of any of clauses 1-7, wherein reconfiguring the at least one transaction request comprises splitting a combined authorization and capture message into a transaction authorization message and a transaction capture message.

Clause 9: A system for reconfiguring a transaction during network processing, the system comprising a server of a payment gateway comprising at least one processor, the server being programmed and/or configured to: receive, from a merchant system, at least one transaction request comprising transaction data, the at least one transaction request configured in an initial configuration associated with a single-message transaction or a dual-message transaction; determine, based at least partly on the transaction data and/or at least one parameter of a merchant profile associated with the merchant system, a recommended configuration associated with a single-message transaction or a dual-message transaction, the recommended configuration different from the initial configuration; reconfigure the at least one transaction request based on the recommended configuration; and generate a communication to a transaction processing system configured to cause the transaction processing system to process the at least one transaction request as a single-message transaction or a dual-message transaction based on the recommended configuration.

Clause 10: The system method of clause 9, wherein determining the recommended configuration is based at least partly on the transaction data and the at least one parameter of the merchant profile.

Clause 11: The system of clause 9 or clause 10, wherein determining the recommended configuration is based at least partly on the transaction data comprising at least one of the following: payment device presence; goods or services description; transaction amount; transaction location; or any combination thereof.

Clause 12: The system of any of clauses 9-11, wherein determining the recommended configuration is based at least partly on the at least one parameter of the merchant profile comprising at least one of the following: merchant category; transaction reversal history; transaction capture history; or any combination thereof.

Clause 13: The system of any of clauses 9-12, wherein the initial configuration is associated with a dual-message transaction, the recommended configuration is associated with a single-message transaction, and reconfiguring the at least one transaction request comprises combining transaction authorization data and transaction capture data from the merchant system into a single communication to the transaction processing system.

Clause 14: The system of any of clauses 9-13, wherein the initial configuration is associated with a single-message transaction, the recommended configuration is associated with a dual-message transaction, and reconfiguring the at least one transaction request comprises splitting a combined authorization and capture message into a transaction authorization message and a transaction capture message.

Clause 15: A computer program product for reconfiguring a transaction during network processing, the computer program product comprising at least one non-transitory computer-readable medium including program instructions that, when executed by at least one processor, cause the at least one processor to: receive, from a merchant system, at least one transaction request comprising transaction data, the at least one transaction request configured in an initial configuration associated with a single-message transaction or a dual-message transaction; determine, based at least partly on the transaction data and/or at least one parameter of a merchant profile associated with the merchant system, a recommended configuration associated with a single-message transaction or a dual-message transaction, the recommended configuration different from the initial configuration; reconfigure the at least one transaction request based on the recommended configuration; and generate a communication to a transaction processing system configured to cause the transaction processing system to process the at least one transaction request as a single-message transaction or a dual-message transaction based on the recommended configuration.

Clause 16: The computer program product of clause 15, wherein determining the recommended configuration is based at least partly on the transaction data and the at least one parameter of the merchant profile.

Clause 17: The computer program product of clause 15 or clause 16, wherein determining the recommended configuration is based at least partly on the transaction data comprising at least one of the following: payment device presence; goods or services description; transaction amount; transaction location; or any combination thereof.

Clause 18: The computer program product of any of clauses 15-17, wherein determining the recommended configuration is based at least partly on the at least one parameter of the merchant profile comprising at least one of the following: merchant category; transaction reversal history; transaction capture history; or any combination thereof.

Clause 19: The computer program product of any of clauses 15-18, wherein the initial configuration is associated with a dual-message transaction, the recommended configuration is associated with a single-message transaction, and reconfiguring the at least one transaction request comprises combining transaction authorization data and transaction capture data from the merchant system into a single communication to the transaction processing system.

Clause 20: The computer program product of any of clauses 15-19, wherein the initial configuration is associated with a single-message transaction, the recommended configuration is associated with a dual-message transaction, and reconfiguring the at least one transaction request comprises splitting a combined authorization and capture message into a transaction authorization message and a transaction capture message.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to non-limiting embodiments as they are oriented in the drawing figures. However, it is to be understood that non-limiting embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "mobile device" may refer to one or more computing devices configured to communicate over one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any computing device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical payment instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a bank. As used herein, the term "acquirer system" may refer to one or more computer systems, computer devices, software applications, and/or the like operated by or on behalf of an acquirer institution.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "server" or "server computer" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a system, method, and computer program product for reconfiguring a transaction during network processing. Described embodiments and aspects improve upon prior art technical solutions by allowing for transactions to be reconfigured in the network process flow, to achieve real-time least cost routing, both in terms of transaction fees and in terms of computer resources (e.g., processing capacity, bandwidth, computer processor units, etc.) required. Where a merchant system may be configured to generate only one type of transaction (e.g., single-message or dual-message), the payment gateway may determine recommended configurations on a transaction-by-transaction level, thereby fixing potentially incorrect formats or inefficient messaging while a transaction itself is being processed through the payment gateway. Furthermore, reconfigured transaction messages in the network may be augmented by a payment gateway to include data (e.g., metadata) of both the initial configuration and recommended configuration, allowing downstream message recipients to observe how reconfigured messages improve the network flow. Moreover, merchant systems may not need to include their own individual computer subroutines designed to identify transaction configuration types when transactions are received at point-of-sale (POS) systems. Instead, payment gateways may act as central, automated configuration systems for multiple merchants, thereby reducing the number of disparate networks and computer devices devoted to transaction configuration.

Figure 1:
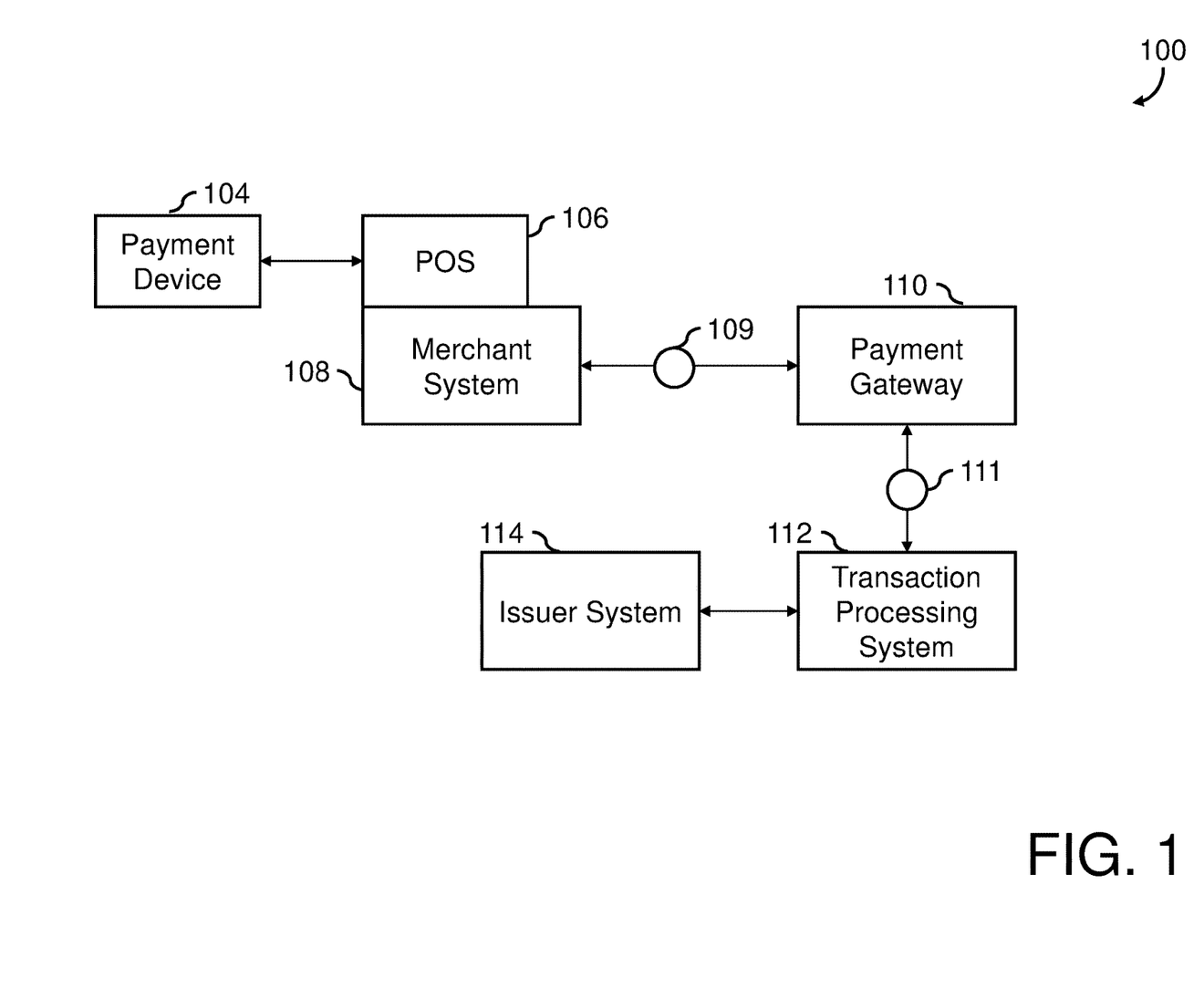
FIG. 1 is a schematic diagram of a non-limiting embodiment of an environment in which systems, apparatuses, and/or methods, as described herein, may be implemented.

With reference to FIG. 1, and in non-limiting embodiments or aspects, illustrated is a diagram of an example environment 100 in which devices, systems, and/or methods, described herein, may be implemented. As shown in FIG. 1, environment 100 includes a payment device 104 that may engage in a transaction with a point-of-sale (POS) system 106 of a merchant. The POS system 106 may be communicatively connected to a merchant system 108 for generating and communicating an initial transaction request 109 to a payment gateway 110. The payment gateway 110 may be included in an acquirer system. The payment gateway 110 may receive an initial transaction request 109 from the merchant system 108 and analyze the initial transaction request 109 to determine if the initial transaction request 109 is configured most efficiently as a single-message transaction or a dual-message transaction. The initial transaction request 109 may include transaction data, which may include, but is not limited to: payment device presence (e.g., status of transaction as card-present transaction, card-not-present transaction); goods or services description (e.g., data of nature of goods or services being paid for); transaction amount; transaction location; merchant identifier; transaction account identifier (e.g., identifier of payment device-associated issuer account); or any combination thereof.

The initial transaction request 109 may be configured (e.g., formatted) in an initial configuration associated with a single-message transaction or a dual-message transaction. The payment gateway 110 may determine a recommended configuration for the initial transaction request 109. The payment gateway 110 may determine the recommended configuration based at least partly on the transaction data and/or at least one parameter of a merchant profile associated with the merchant system 108. The payment gateway 110 may include and/or be associated with a database configured to store merchant profiles associated with merchants. Merchant profiles may be fetched by a merchant identifier associated with the initial transaction request 109. Merchant profiles may include settings, preferences, and/or transaction history associated with a merchant, by which configuration determinations can be made. Parameters of merchant profiles that may be used to determine a recommended configuration include, but are not limited to: merchant category (e.g., industry type, business type, merchant category code); transaction reversal history (e.g., data of the merchant's history of reversing transactions, which may be based on type of transaction); and transaction capture history (e.g., data of merchant's history of capturing funds for past transactions, such as instantly capturing the transaction funds, delaying capture of transaction funds).

By way of non-limiting example, the payment gateway 110 may determine a recommended configuration based on transaction data including payment device presence, such as where card-not-present (CNP) transactions or card-present (CP) transactions are predetermined (e.g., by a payment gateway sampling transactions over a prior time period) as more or less likely to be associated with single-message or dual-message transactions. The payment gateway 110 may determine a recommended configuration based on transaction data including a goods or services description, such as where certain types of goods or services are predetermined as associated with single-message (e.g., digital goods, groceries) or dual-message (e.g., restaurant services, hotel services) transactions. The payment gateway 110 may determine a recommended configuration based on transaction data including transaction amount, such as where statistically significantly low or high amounts are predetermined as associated with single-message (e.g., less than $5, which may represent micro-transactions) or dual-message (e.g., greater than $500). The payment gateway 110 may determine a recommended configuration based on transaction data including transaction location, such as where a location is predetermined as a frequent source of single-message (e.g., online marketplace address) or dual-message (e.g., restaurant location, gas station location) transactions. The payment gateway 110 may also determine a recommended configuration based on a step of the transaction, such as a first payment with a return window or a subsequent payment with no return window. The foregoing examples are illustrative and are not to be interpreted as limiting.

By way of further non-limiting example, the payment gateway 110 may determine a recommended configuration based on a parameter of a merchant profile including a merchant category of the merchant from which the initial transaction request 109 originates, such as when a merchant category is predetermined (e.g., by a payment gateway sampling transactions over a prior time period) to be associated with single-message (e.g., digital goods retailer) or dual-message (e.g., gas station merchant code, restaurant merchant code) transactions. The payment gateway 110 may determine a recommended configuration based on a parameter of a merchant profile including transaction reversal history of the merchant from which the initial transaction request 109 originates, such as when a merchant historically frequently (e.g., likely to be dual-message) or rarely (e.g., likely to be single-message) reverses a transaction authorization. The payment gateway 110 may determine a recommended configuration based on a parameter of a merchant profile including transaction capture history of the merchant from which the initial transaction request 109 originates, such as when a merchant historically frequently delays (e.g., likely to be dual-message) or instantly initiates (e.g., likely to be single-message) funds capture. One or more elements of transaction data and/or parameters of merchant profiles may be considered, alone or in combination, to determine a recommended configuration. The foregoing examples are illustrative and are not to be interpreted as limiting.

The payment gateway 110 may determine a recommended configuration that is the same as the initial configuration. For example, the recommended and initial configurations may be both single-message configurations or both dual-message configurations. In such a case, the initial transaction request 109 may be forwarded to the transaction processing system 112 for processing without reconfiguration. However, the payment gateway 110 may determine a recommended configuration that is different from the initial configuration. For example, the recommended configuration may be single-message while the initial configuration may be dual-message, or the recommended configuration may be dual-message while the initial configuration may be single-message. In such a case, the payment gateway may reconfigure the initial transaction request 109 based on the recommended configuration (e.g., reformatting single-message as dual-message, or dual-message as single-message). Reconfigured transaction requests 111 may be forwarded to the transaction processing system 112 for processing. The payment gateway 110 may generate a communication (e.g., including the initial transaction request 109 or reconfigured transaction request 111) to the transaction processing system 112 to cause the transaction processing system 112 to process the transaction as a single-message transaction or a dual-message transaction based on the recommended configuration. The transaction processing system 112 may communicate with the issuer system 114 to authorize and/or capture funds for completion of the transaction.

When the payment gateway 110 receives an initial transaction request 109 that is initially configured as a single-message transaction, but determines a recommended configuration of a dual-message transaction, the payment gateway 110 may split the initial transaction request 109, which may have combined authorization and capture messages, into one or more separate transaction authorization messages and transaction capture messages. When the payment gateway 110 receives an initial transaction request 109 that is initially configured as a dual-message transaction, but determines a recommended configuration of a single-message transaction, the payment gateway 110 may combine transaction authorization data and transaction capture data from the merchant system 108 (e.g., from separate messages) into a single communication to the transaction processing system 112.

Communications in the network downstream of the payment gateway 110 may be augmented to carry extra information, such as in the case of the payment gateway 110 making modifications to a transaction request message, which may include an optimization analysis. Such downstream communications may include the initial transaction request 109 submitted by the merchant system 108, data of the optimization decision made by the payment gateway 110, and/or the reconfigured transaction request 111. Both the initial transaction request 109 and the reconfigured transaction request 111 may be communicated together to allow the merchant system 108, transaction processing system 112, and/or issuer system 114 to make more informed decisions about costs and efficiencies associated with a given transaction.

Figure 2:
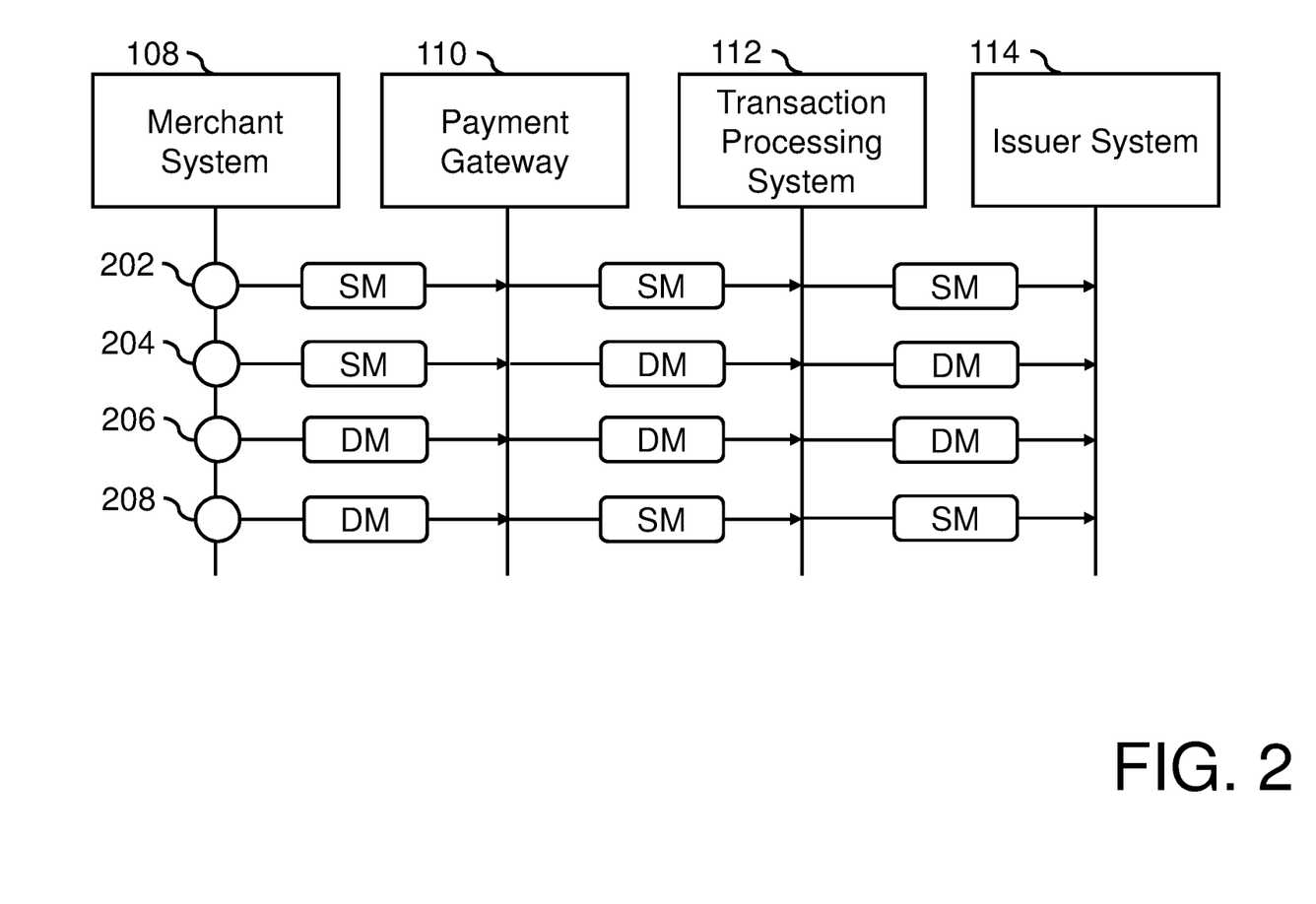
FIG. 2 is a flow diagram illustrating a non-limiting embodiment of a system and method for reconfiguring a transaction during network processing according to the principles of the present disclosure.

With reference to FIG. 2, and in non-limiting embodiments or aspects, illustrated is a flow diagram of reconfiguring a transaction during network processing. Illustrated are four exemplary scenarios of transaction requests that may be generated at the merchant system 108: a first transaction request 202 with an initial configuration of a single-message transaction and a recommended configuration of a single-message transaction; a second transaction request 204 with an initial configuration of a single-message transaction and a recommended configuration of a dual-message transaction; a third transaction request 206 with an initial configuration of a dual-message transaction and a recommended configuration of a dual-message transaction; and a fourth transaction request 208 with an initial configuration of a dual-message transaction and a recommended configuration of a single-message transaction.

In the non-limiting example of the first transaction request 202, the merchant system 108 communicates the first transaction request 202 to the payment gateway 110. The first transaction request 202 is initially configured as a single-message (SM) transaction. The payment gateway 110 determines (e.g., based at least partly on transaction data and/or one or more parameters of a merchant profile) that the recommended configuration for the first transaction request 202 is single-message (SM). As such, the payment gateway 110 generates a communication to the transaction processing system 112 (e.g., including the initial transaction request) configured to cause the transaction processing system 112 to process the first transaction request 202 according to single-message procedures. The transaction processing system 112 may then communicate with the issuer system 114 to process the first transaction request 202 according to single-message procedures, such as to authorize and capture funds in one network communication.

In the non-limiting example of the second transaction request 204, the merchant system 108 communicates the second transaction request 204 to the payment gateway 110. The second transaction request 204 is initially configured as a single-message (SM) transaction. The payment gateway 110 determines (e.g., based at least partly on transaction data and/or one or more parameters of a merchant profile) that the recommended configuration for the second transaction request 204 is dual-message (DM). As such, the payment gateway 110 generates a communication to the transaction processing system 112 (e.g., including a reconfigured transaction request) configured to cause the transaction processing system 112 to process the second transaction request 204 according to dual-message procedures. The transaction processing system 112 may then communicate with the issuer system 114 to process the second transaction request 204 according to dual-message procedures, such as to authorize and capture funds in separate network communications.

In the non-limiting example of the third transaction request 206, the merchant system 108 communicates the third transaction request 206 to the payment gateway 110. The third transaction request 206 is initially configured as a dual-message (DM) transaction. The payment gateway 110 determines (e.g., based at least partly on transaction data and/or one or more parameters of a merchant profile) that the recommended configuration for the third transaction request 206 is dual-message (DM). As such, the payment gateway 110 generates a communication to the transaction processing system 112 (e.g., including the initial transaction request) configured to cause the transaction processing system 112 to process the third transaction request 206 according to dual-message procedures. The transaction processing system 112 may then communicate with the issuer system 114 to process the third transaction request 206 according to dual-message procedures, such as to authorize and capture funds in separate network communications.

In the non-limiting example of the fourth transaction request 208, the merchant system 108 communicates the fourth transaction request 208 to the payment gateway 110. The fourth transaction request 208 is initially configured as a dual-message (DM) transaction. The payment gateway 110 determines (e.g., based at least partly on transaction data and/or one or more parameters of a merchant profile) that the recommended configuration for the fourth transaction request 208 is single-message (SM). As such, the payment gateway 110 generates a communication to the transaction processing system 112 (e.g., including a reconfigured transaction request) configured to cause the transaction processing system 112 to process the fourth transaction request 208 according to single-message procedures. The transaction processing system 112 may then communicate with the issuer system 114 to process the fourth transaction request 208 according to single-message procedures, such as to authorize and capture funds in one network communication.

Figure 3:
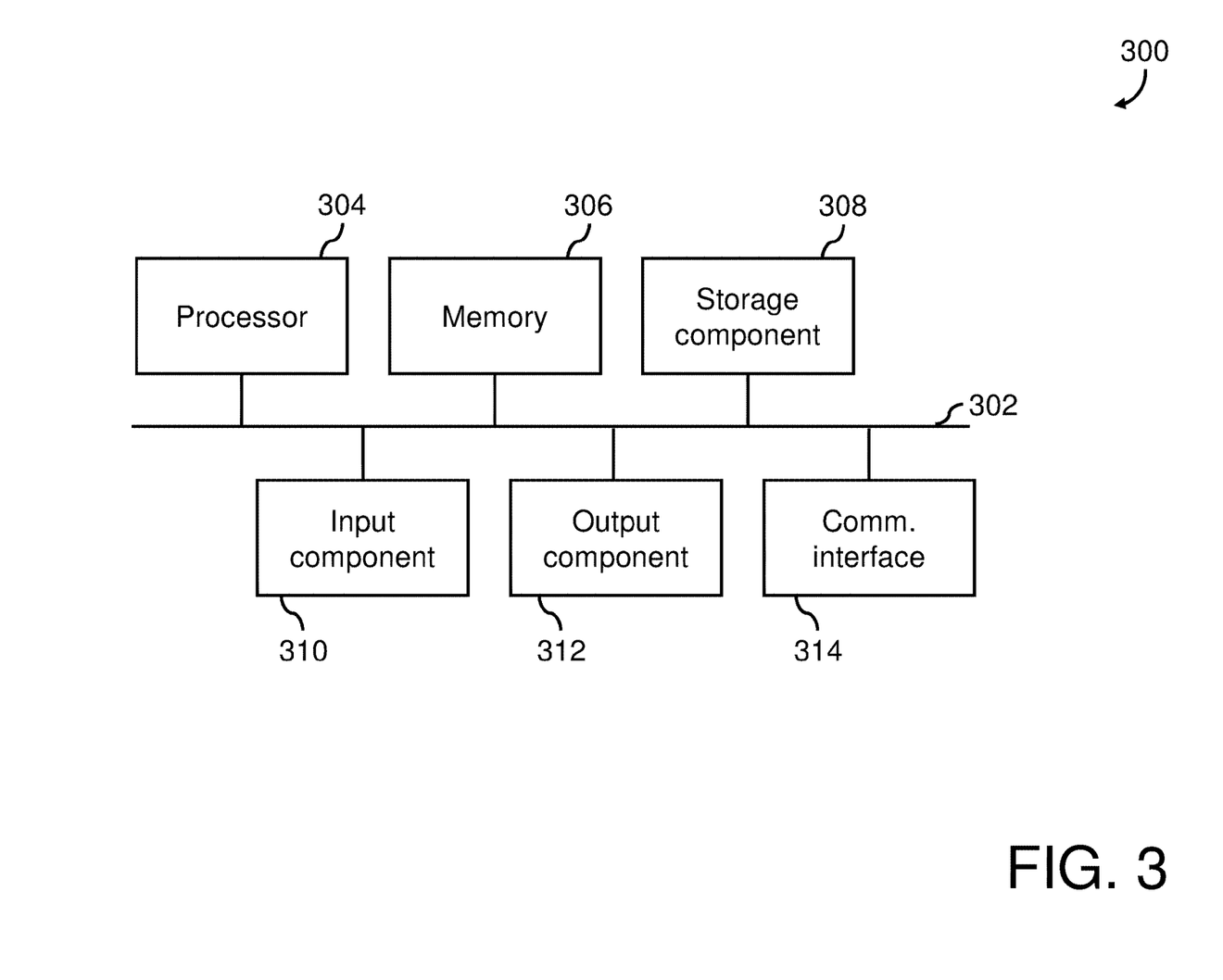
FIG. 3 is a diagram of a non-limiting embodiment of components of one or more devices of FIG. 1.

With reference to FIG. 3, and in non-limiting embodiments or aspects, illustrated is a diagram of example components of device 300. Device 300 may correspond to one or more devices of payment device 104, one or more devices of a point-of-sale (POS) system 106, one or more devices of a merchant system 108, one or more devices of a payment gateway 110, one or more devices of a transaction processing system 112, and/or one or more devices of an issuer system 114. In some non-limiting embodiments or aspects, one or more devices of the foregoing may include at least one device 300 and/or at least one component of device 300. As shown in FIG. 3, device 300 may include bus 302, processor 304, memory 306, storage component 308, input component 310, output component 312, and communication interface 314.

Bus 302 may include a component that permits communication among the components of device 300. In some non-limiting embodiments or aspects, processor 304 may be implemented in hardware, software, or a combination of hardware and software. For example, processor 304 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 may include random access memory (RAM), read-only memory (ROM), and/or another type of dynamic or static storage device (e.g., flash memory, magnetic memory, optical memory, etc.) that stores information and/or instructions for use by processor 304.

Storage component 308 may store information and/or software related to the operation and use of device 300. For example, storage component 308 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 may include a component that permits device 300 to receive information, such as via user input (e.g., a touchscreen display, a keyboard, a keypad, a mouse, a button, a switch, a microphone, a camera, etc.). Additionally or alternatively, input component 310 may include a sensor for sensing information (e.g., a global positioning system (GPS) component, an accelerometer, a gyroscope, an actuator, etc.). Output component 312 may include a component that provides output information from device 300 (e.g., a display, a speaker, one or more light-emitting diodes (LEDs), etc.).

Communication interface 314 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 314 may permit device 300 to receive information from another device and/or provide information to another device. For example, communication interface 314 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 300 may perform one or more processes described herein. Device 300 may perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 306 and/or storage component 308 from another computer-readable medium or from another device via communication interface 314. When executed, software instructions stored in memory 306 and/or storage component 308 may cause processor 304 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 306 and/or storage component 308 may include data storage or one or more data structures (e.g., a database, and/or the like). Device 300 may be capable of receiving information from, storing information in, communicating information to, or searching information stored in the data storage or one or more data structures in memory 306 and/or storage component 308. For example, the information may include encryption data, input data, output data, transaction data, account data, or any combination thereof.

The number and arrangement of components shown in FIG. 3 are provided as an example. In some non-limiting embodiments or aspects, device 300 may include additional components, fewer components, different components, or differently arranged components than those shown in FIG. 3. Additionally or alternatively, a set of components (e.g., one or more components) of device 300 may perform one or more functions described as being performed by another set of components of device 300.

Figure 4:
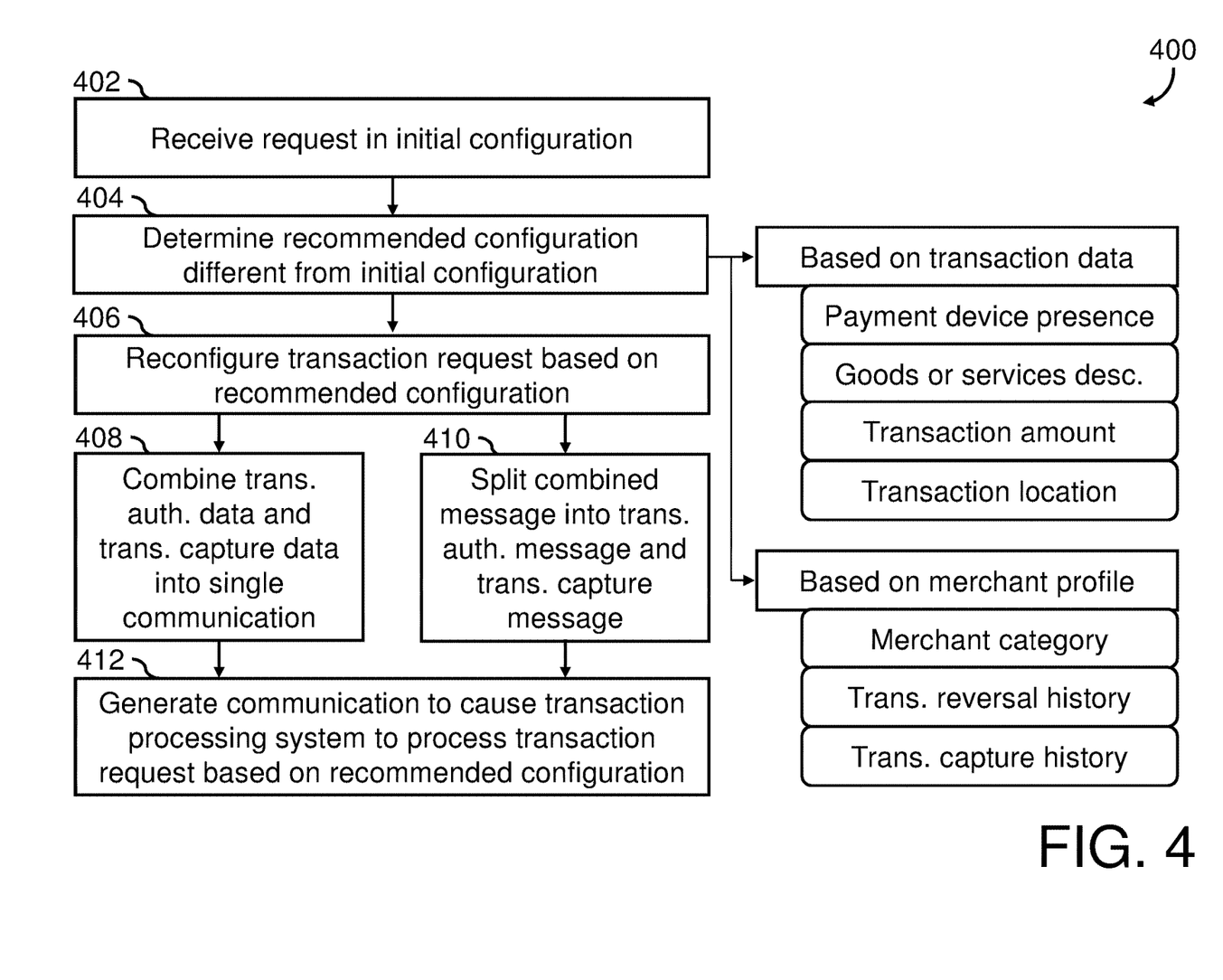
FIG. 4 is a flow diagram illustrating a non-limiting embodiment of a method for reconfiguring a transaction during network processing according to the principles of the present disclosure.

With reference to FIG. 4, and in non-limiting embodiments or aspects, illustrated is a method 400 of reconfiguring a transaction during network processing. One or more steps of the method 400 may be performed by one or more devices of: a POS system 106, a merchant system 108, a payment gateway 110, a transaction processing system 112, and/or an issuer system 114. In step 402, the payment gateway may receive, from a merchant system, one or more transaction requests including transaction data. The one or more transaction requests may be configured in an initial configuration associated with a single-message transaction (e.g., a combined message with authorization and capture data) or a dual-message transaction (e.g., one or more messages separating authorization and capture phases).

In step 404, the payment gateway may determine, based at least partly on the transaction data and/or at least one parameter of a merchant profile associated with the merchant system (e.g., by a merchant identifier), a recommended configuration. The recommended configuration may be associated with a single-message transaction or a dual-message transaction, and may be different from the initial configuration. The recommended configuration may be based at least partly on transaction data including one or more of: payment device presence; goods or services description; transaction amount; transaction location; or any combination thereof. The recommended configuration may be based at least partly on one or more parameters of the merchant profile including one or more of: merchant category; transaction reversal history; transaction capture history; or any combination thereof.

In step 406, the payment gateway may reconfigure the one or more transaction requests based on the recommended configuration (e.g., reformat one or more single-message transactions as dual-message transactions, reformat one or more dual-message transactions as single-message transactions). If the initial configuration of a transaction request is associated with a dual-message transaction and the recommended configuration of the transaction request is associated with a single-message transaction, the payment gateway may, in step 408, combine transaction authorization data and transaction capture data from the merchant system into a single communication to the transaction processing system, such as in step 412. If the initial configuration of a transaction request is associated with a single-message transaction and the recommended configuration of the transaction request is associated with a dual-message transaction, the payment gateway may, in step 410, split a combined authorization and capture message (e.g., of a transaction request) into a transaction authorization message and a transaction capture message.

In step 412, the payment gateway may generate a communication to a transaction processing system configured to cause the transaction processing system to process each of the one or more transaction requests as a single-message transaction or a dual-message transaction based on each respective recommended configuration. For recommended configurations of transaction requests that are the same as initial configurations, the transaction requests may be left as originally configured.

Although the disclosure has been described in detail for the purpose of illustration based on what is currently considered to be the most practical and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method, comprising:
   receiving, with at least one processor of a payment gateway and from a merchant system, at least one transaction request comprising transaction data, the at least one transaction request configured in an initial configuration associated with a dual-message transaction;
   determining, with the at least one processor of the payment gateway, based at least partly on the transaction data, a recommended configuration associated with a single-message transaction, the recommended configuration different from the initial configuration and based on at least one of the following elements of the transaction data: payment device presence, goods or services description, transaction amount, or any combination thereof;
   augmenting, with the at least one processor of the payment gateway, the at least one transaction request to include metadata of (i) the initial configuration associated with a dual-message transaction and (ii) the recommended configuration associated with a single-message transaction;
   reconfiguring, with the at least one processor of the payment gateway, the at least one transaction request based on the recommended configuration; and
   generating, with the at least one processor of the payment gateway, a communication to a transaction processing system configured to cause the transaction processing system to process the at least one transaction request as a single-message transaction based on the recommended configuration.

2. The computer-implemented method of claim 1, wherein determining the recommended configuration comprises:
   determining the recommended configuration based at least partly on the transaction data and at least one parameter of a merchant profile associated with the merchant system.

3. The computer-implemented method of claim 2, wherein determining the recommended configuration comprises:
   determining the recommended configuration based at least partly on the at least one parameter of the merchant profile, wherein the at least one parameter of the merchant profile comprises at least one of the following: merchant category transaction reversal history, transaction capture history, or any combination thereof.

4. The computer-implemented method of claim 1, wherein determining the recommended configuration comprises:
   determining the recommended configuration based on the goods or services description of the transaction data being associated with single-message transactions.

5. The computer-implemented method of claim 1, wherein determining the recommended configuration comprises:
   determining that the initial configuration is in an incorrect configuration based at least partly on the transaction data.

6. The computer-implemented method of claim 1, wherein reconfiguring the at least one transaction request comprises combining transaction authorization data and transaction capture data from the merchant system into a single communication to the transaction processing system.

7. A system comprising at least one processor of a payment gateway, the at least one processor being programmed or configured to:
   receive, from a merchant system, at least one transaction request comprising transaction data, the at least one transaction request configured in an initial configuration associated with a dual-message transaction;
   determine, based at least partly on the transaction data, a recommended configuration associated with a single-message transaction, the recommended configuration different from the initial configuration and based on at least one of the following elements of the transaction data: payment device presence, goods or services description, transaction amount, or any combination thereof;

augment the at least one transaction request to include metadata of (i) the initial configuration associated with a dual-message transaction and (ii) the recommended configuration associated with a single-message transaction;

reconfigure the at least one transaction request based on the recommended configuration; and generate a communication to a transaction processing system configured to cause the transaction processing system to process the at least one transaction request as a single-message transaction based on the recommended configuration.

8. The system of claim 7, wherein, when determining the recommended configuration, the at least one processor is programmed or configured to:

determine the recommended configuration based at least partly on the transaction data and at least one parameter of a merchant profile associated with the merchant system.

9. The system of claim 8, wherein, when determining the recommended configuration, the at least one processor is programmed or configured to:

determine the recommended configuration based at least partly on the at least one parameter of the merchant profile, wherein the at least one parameter of the merchant profile comprises at least one of the following: merchant category, transaction reversal history, transaction capture history, or any combination thereof.

10. The system of claim 7, wherein, when determining the recommended configuration, the at least one processor is programmed or configured to:

determine the recommended configuration based on the goods or services description of the transaction data being associated with single-message transactions.

11. The system of claim 7, wherein, when determining the recommended configuration, the at least one processor is programmed or configured to:

determine that the initial configuration is in an incorrect configuration based at least partly on the transaction data.

12. The system of claim 7, wherein, when reconfiguring the at least one transaction request, the at least one processor is programmed or configured to combine transaction authorization data and transaction capture data from the merchant system into a single communication to the transaction processing system.

13. A computer-implemented method comprising:

receiving, with at least one processor of a payment gateway and from a merchant system, at least one transaction request comprising transaction data, the at least one transaction request configured in an initial configuration associated with a single-message transaction;

determining, with the at least one processor of the payment gateway, based at least partly on the transaction data, a recommended configuration associated with a dual-message transaction, the recommended configuration different from the initial configuration and based on at least one of the following elements of the transaction data: payment device presence, goods or services description, transaction amount, or any combination thereof;

augmenting, with the at least one processor of the payment gateway, the at least one transaction request to include metadata of (i) the initial configuration associated with a single-message transaction and (ii) the recommended configuration associated with a dual-message transaction;

reconfiguring, with the at least one processor of the payment gateway, the at least one transaction request based on the recommended configuration; and generating, with the at least one processor of the payment gateway, a communication to a transaction processing system configured to cause the transaction processing system to process the at least one transaction request as a dual-message transaction based on the recommended configuration.

14. The computer-implemented method of claim 13, wherein determining the recommended configuration comprises:

determining the recommended configuration based at least partly on the transaction data and at least one parameter of a merchant profile associated with the merchant system.

15. The computer-implemented method of claim 14, wherein determining the recommended configuration comprises:

determining the recommended configuration based at least partly on the at least one parameter of the merchant profile, wherein the at least one parameter of the merchant profile comprises at least one of the following: merchant category, transaction reversal history, transaction capture history, or any combination thereof.

16. The computer-implemented method of claim 13, wherein determining the recommended configuration comprises:

determining that the initial configuration is in an incorrect configuration based at least partly on the transaction data.

17. The computer-implemented method of claim 13, wherein reconfiguring the at least one transaction request comprises separating transaction authorization data and transaction capture data from the merchant system into two communications to the transaction processing system.

* * * * *